(12) United States Patent
Shikatani (10) Patent No.: US 6,735,226 B2
(45) Date of Patent: May 11, 2004

(54) METHOD AND APPARATUS FOR GENERATING OPTICAL PULSES

(75) Inventor: Motokazu Shikatani, Koganei (JP)

(73) Assignee: Communications Research Laboratory, Independent Administrative Institution, Koganei (JP)

( * ) Notice: Subject to any disclaimer, the term of this patent is extended or adjusted under 35 U.S.C. 154(b) by 0 days.

(21) Appl. No.: 10/214,199

(22) Filed: Aug. 8, 2002

(65) Prior Publication Data

US 2003/0043863 A1 Mar. 6, 2003

(30) Foreign Application Priority Data

Aug. 8, 2001 (JP) ........................ 2001-242838

(51) Int. Cl.[7] ............... H01S 3/10; H01S 3/08
(52) U.S. Cl. ............... 372/26; 372/25; 372/98
(58) Field of Search ............... 372/25, 26, 98, 372/101

(56) References Cited

U.S. PATENT DOCUMENTS

| | | | |
|---|---|---|---|
| 5,274,659 A | * 12/1993 | Harvey et al. | ........ 372/94 |
| 2001/0021053 A1 | * 9/2001 | Colbourne et al. | ........ 359/161 |
| 2002/0044574 A1 | * 4/2002 | Abedin | ........ 372/18 |
| 2003/0007521 A1 | * 1/2003 | Yu | ........ 372/20 |

OTHER PUBLICATIONS

Abedin et al. "Higher Order FM Mode Locking for Pulse–Repetition–Rate Enhancement in Actively Mode–Locked Lasers: Theor and Experiment," IEEE Journal of Quantum Electronics, vol. 35, No. 6, Jun. 1999, pp. 875–890.*

Shikatani et al. "Pulse Repetition Rate Enhanced Mode–Locking Laser with Compensation Filter," Proceedings of the 2000 Conference of the Electronics Society of the IEICE, Oct. 2000, Nagoya, Japan, C–4–29, p. 377.*

* cited by examiner

*Primary Examiner*—Paul Ip
*Assistant Examiner*—James Menefee
(74) *Attorney, Agent, or Firm*—Oblon, Spivak, McClelland, Maier & Neustadt, P.C.

(57) ABSTRACT

A method and apparatus for generating optical pulses using an active mode-locking laser that includes a first modulation device, an optical selection device, a second modulation device and an amplification device. The method includes the steps of using the first modulation device to modulate a lightwave, selecting a modulation lightwave signal having a high frequency component by passing a lightwave through the optical selection device in a first direction, using the second modulation device to modulate a lightwave, selecting a modulation lightwave signal having a high frequency component by passing a lightwave through the optical selection device in a second direction, amplifying the lightwave selected by the above step, and supplying the amplified lightwave to the first modulation device.

7 Claims, 7 Drawing Sheets

METHOD AND APPARATUS FOR GENERATING OPTICAL PULSES

BACKGROUND OF THE INVENTION

1. Field of the Invention

The present invention relates to a method and apparatus for generating optical pulse signals used in optical communications. The invention particularly relates to a method and apparatus for generating optical pulse signals that uses an active mode-locking laser to generate uniform pulses.

2. Description of the Prior Art

One technique of increasing the amount of information that can be transmitted by an optical communications system involves the use of millimeter-wave modulated lightwave. This requires a method of stably generating millimeter-wave modulated lightwave. One such method that has drawn attention uses a mode-locked laser, more specifically, a method of modulating a laser beam in a laser resonator. This method uses a phase modulator (PM) provided in the laser resonator, an isolator (I) and a Fabry-Perot etalon (FP), forming a configuration that is herein referred to as a "PM-I-FP" system. If the free spectral range (FSR) of the Fabry-Perot etalon is set at $Kf_m$, where $f_m$ is modulation frequency and K is the order of the side band of the modulation, the result is a promising method that can generate optical pulses of repetition frequency $Kf_m$.

With this method, the phase modulation index can be increased to generate pulses of repetition frequency $2\ Kf_m$, but the pulse waveform loses its uniformity, as has been reported by Abedin et al. (Abedin, Onodera, Hyodo, "Higher Order FM Mode Locking for Pulse-Repetition-Rate Enhancement in Active Mode-Locking Lasers: Theory and Experiment," IEEE Journal of Quantum Electronics, Vol. 35, No. 6, June 1999).

Figure 4:
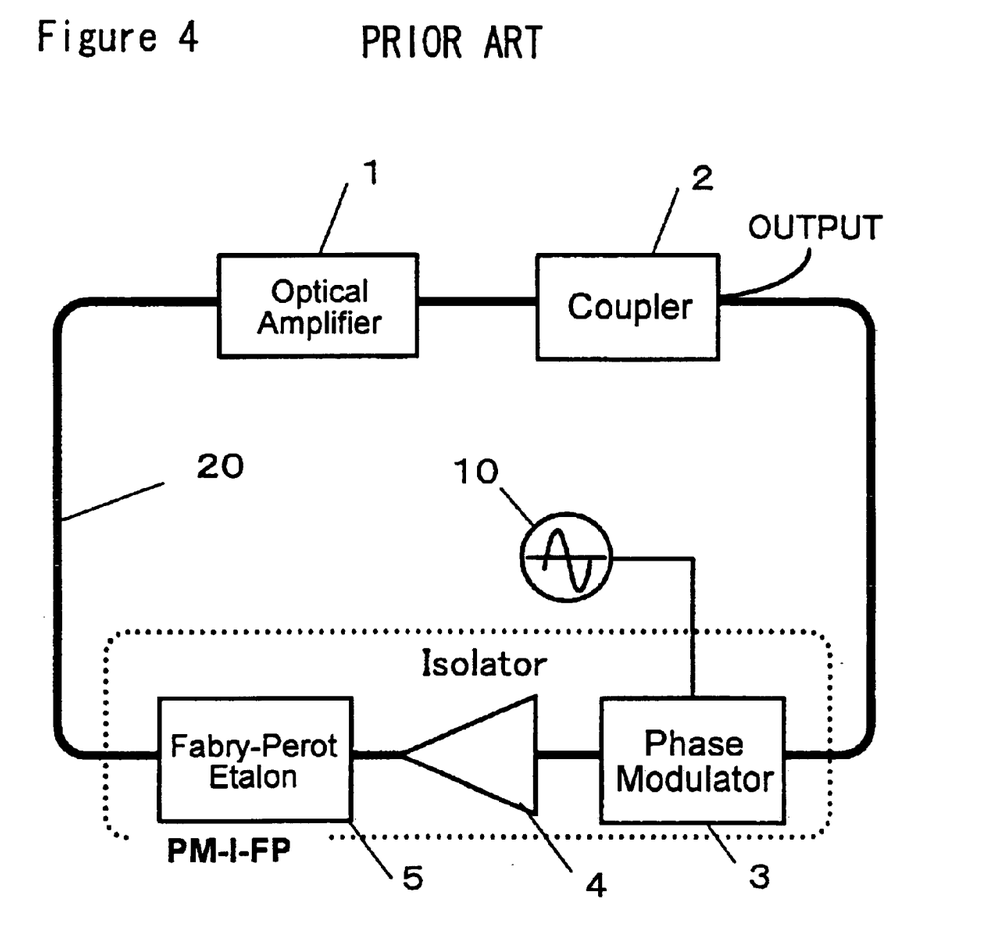
FIG. 4 is a diagram showing the configuration of a first example of a prior-art optical pulse generation apparatus.

FIG. 4 shows a first example of a prior-art configuration described by Abedin et al that uses a PM-I-FP system arrangement. With this configuration, when phase-modulated signal frequency $f_m$, order K and the Fabry-Perot etalon FSR have the relationship shown by the following equation 1, the optical pulses circulate in the direction PM-I-FP→optical amplifier→coupler→PM-I-FP, and optical pulse train outputs of repetition frequency $f_p = Kf_m$ are extracted through the coupler.

$$FSR = Kf_m \quad (1)$$

Figure 5:
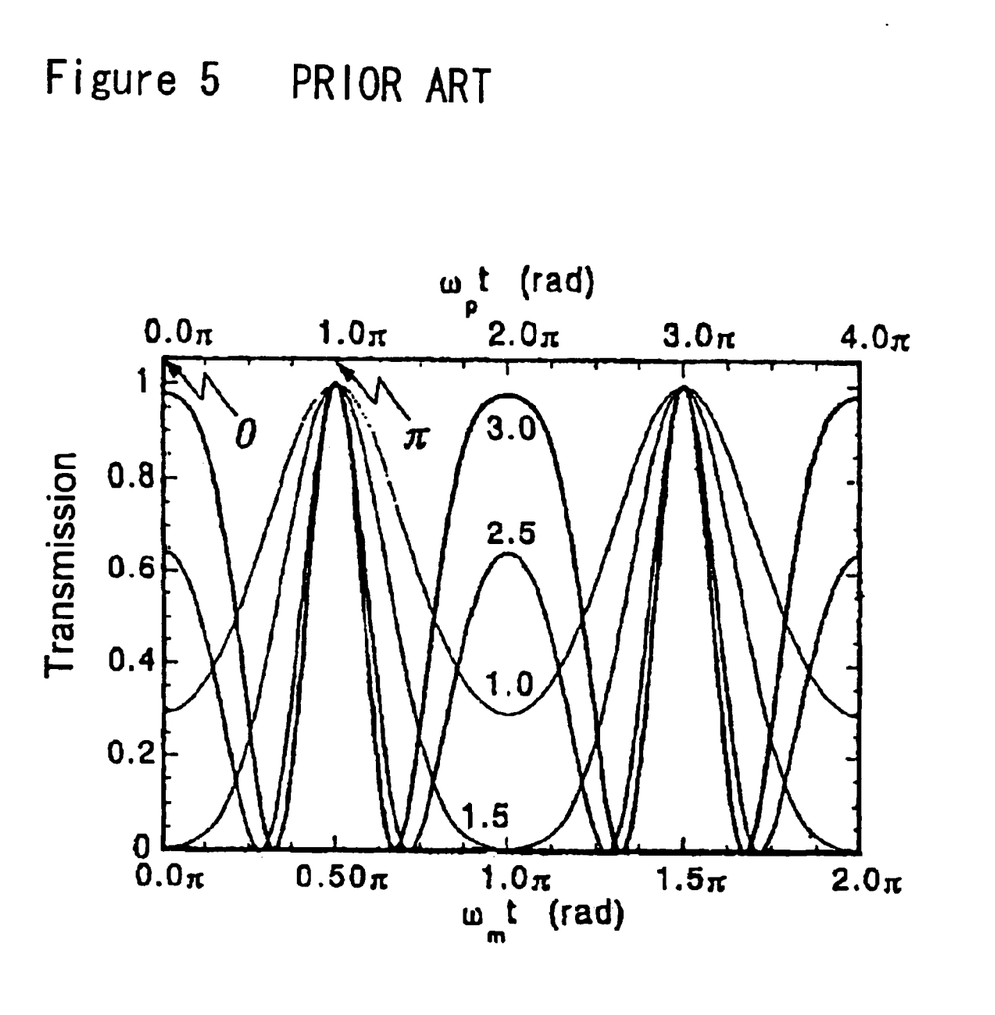
FIG. 5 shows the transmission characteristics of a (K=2) PM-I-FP system, based on numerical analysis.

Here, the PM-I-FP system transfer function and transmission are functions of time t; if these are denoted as M(t) and p(t) respectively, then $p(t) = |M(t)|^2$. Also, when $\omega_p t = 2\ \pi Kf_m$, it is known that transmission p(t) assumes the relative maximum value when it is an even multiple of $\pi$, $\omega_p t = 0, 2\pi, \ldots$, (0 (zero) phase state) and when it is an odd multiple of $\pi$, $\omega_p t = 0, 3\pi, \ldots$, ($\pi$ phase state). FIG. 5 shows the transmission of a K=2 PM-I-FP system with respect to various phase modulation indices $\Delta$. Here, $\omega_m = 2\ \pi f_m$, where $\omega_m$ is the angular frequency of the phase-modulated signal. Generally, the transfer function of a PM-I-FP system takes a different value in the 0 phase state and the $\pi$ phase state. Therefore, when the pulses pass the PM-I-FP system in either the 0 phase state or the n phase state. Uniform optical pulses are being generated in a mode-locked state. There are cases where, depending on the combination of the order K and the phase modulation index $\Delta$, the pulses are transmitted by the PM-I-FP system in both phase states, but in most such cases the oscillations are unstable and the pulse waveforms are not uniform The reason for this is that the transfer function M(t) in the 0 phase state is not the same as the transfer function M(t) in the $\pi$ phase state.

Shikatani et al. proposed a method of generating pulses using two PM-I-FP systems connected in series, with each Fabry-Perot etalon having the same free spectral range $Kf_m$ and each phase modulator having the same modulation frequency $f_m$. In addition, the modulation signal phase was adjusted to an appropriate setting. This made it possible to generate pulses at the repetition frequency $2\ Kf_m$ that were shorter than those generated with a configuration that used just one PM-I-FP system (Shikatani et al., "Method of generating double-pulses using active mode-locking laser with compensation filter," Proceedings of the 2000 Electronics Society Conference of The Institute of Electronic, Information and Communication Engineers, C-4-29, page 377).

Figure 6:
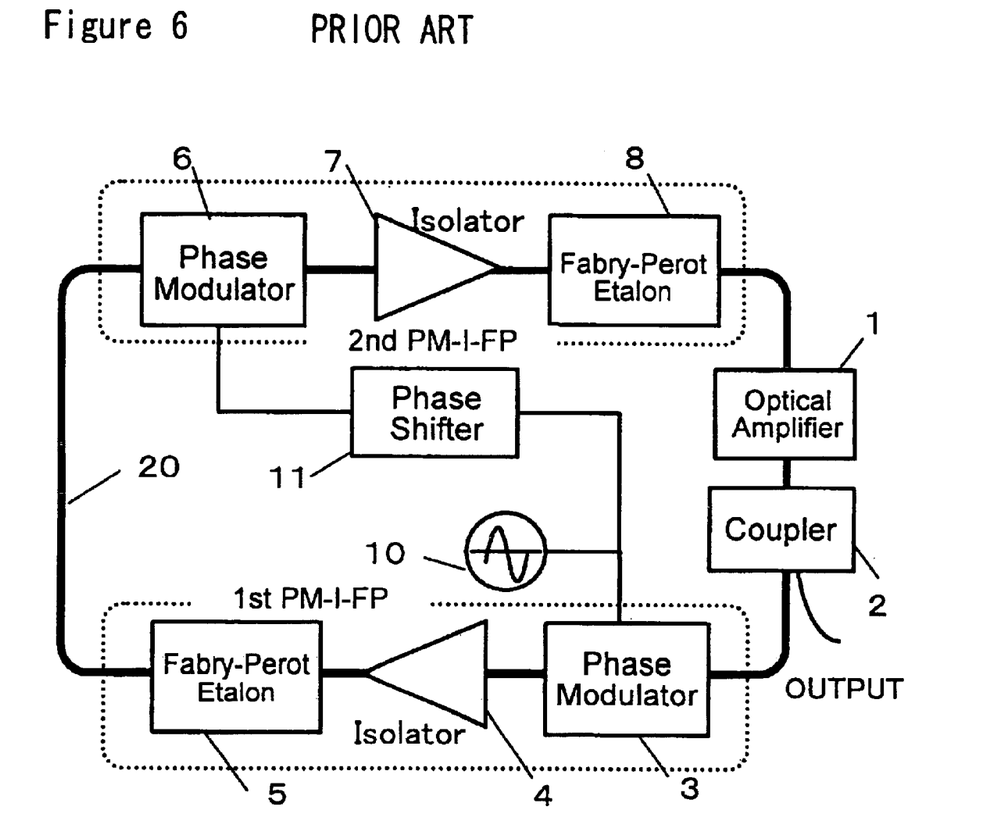
FIG. 6 is a block diagram showing the basic configuration of a second example of a prior-art optical pulse generation apparatus.

FIG. 6 shows a second example of a prior-art configuration according to Shikatani et al., which uses two PM-I-FP systems. Compared to FIG. 4, the configuration of FIG. 6 has another PM-I-FP system disposed within a ring laser. The optical pulses circulate in the direction first PM-I-FP system→second PM-I-FP system→optical amplifier→coupler→first PM-I-FP system, and optical pulse trains are extracted via the coupler. The relationship between the FSR, $f_m$ and K is that of equation 1. When $\Delta t$ is the time taken for optical pulses to propagate from the first PM-I-FP system to the second PM-I-FP system and the phase difference of the phase modulation signal applied to the first and second PM-I-FP systems is set as shown in equation 2, the repetition frequency of the output pulses is $2\ Kf_m$.

$$\phi = \frac{\pi}{K} - 2\pi f_m \Delta t \quad (2)$$

Figure 7:
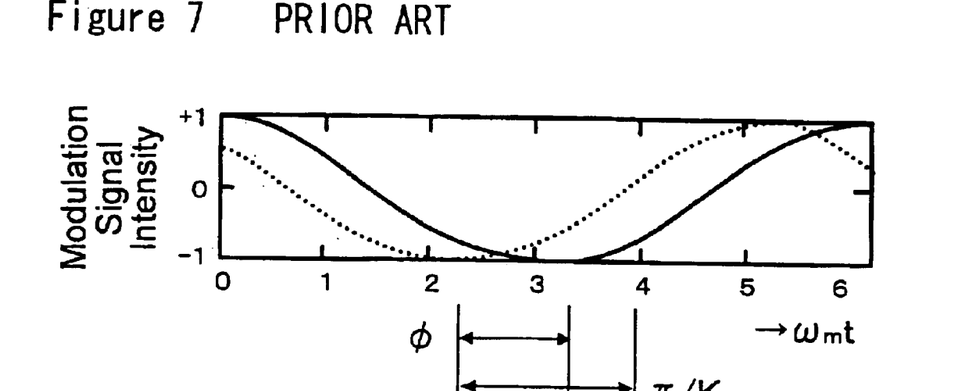
FIG. 7 shows modulation signals used in the second example of the prior art.
Figure 8:
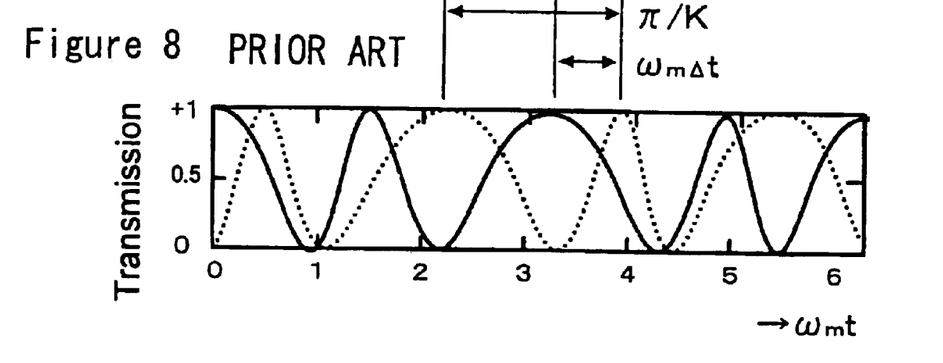
FIG. 8 shows transmission plotted against time, in the second example of the prior art.
Figure 9:
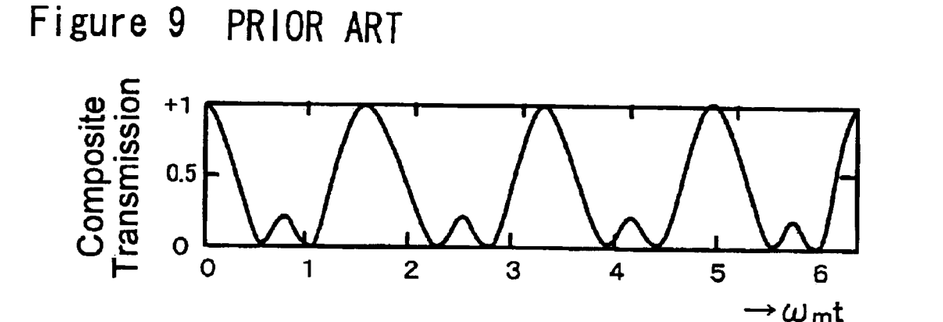
FIG. 9 shows the composite transmission of first and second PM-I-FP systems plotted against time, in the second example of the prior art.

FIGS. 7, 8 and 9 show examples of the modulation signals and transmission values in the case of FIG. 6. In the case of FIG. 7, the solid line indicates the modulation signal of the first PM-I-FP system and the broken line indicates the modulation signal of the second PM-I-FP system.

FIG. 8 shows transmission plotted against time, with the transmission of the first PM-I-FP system being denoted by the solid line and the transmission of the second PM-I-FP system being denoted by the broken line. FIG. 9 shows the composite transmission of the first and second PM-I-FP systems, plotted against time. When pulses of repetition frequency $2\ Kf_m$ pass through the first PM-I-FP system, the system is in the 0 phase state (or $\pi$ phase state), and when the pulses pass through the second PM-I-FP system, the system is in the phase state (or 0 phase state). Therefore, all pulses receive the same amount of modulation while circulating through the optical path in the resonator one time. This is also shown by the transmission curve in FIG. 9. The repetition frequency of the transmission is $2\ Kf_m$. The system is characterized not only by the fact that repetition frequency of the output pulses is $2\ Kf_m$, but also by the narrow pulse width and the absence of chirp modulation.

However, in the case of the above method proposed by Shikatani et al., the FSR of the Fabry-Perot etalon of each of the two PM-I-FP systems has to be the same. However, since the structural materials of the Fabry-Perot etalons are sensitive to the environmental temperature change and mechanical distortion, it is not easy to maintain plural Fabry-Perot etalons at the same FSR. In order to maintain the same FSR, it is necessary to use thermostat or the like to rigorously control the temperature and to situate the system in a location that is free of vibration.

An object of the present invention is to provide the functions of a configuration that has two PM-I-FP systems, each with its own Fabry-Perot etalon, by using a configuration having just one Fabry-Perot etalon which is used by both PM-I-FP systems, thus eliminating the need to maintain plural Fabry-Perot etalons at the same FSR, which is a problem of the prior art configurations.

SUMMARY OF THE INVENTION

In accordance with the present invention, the above object is attained by a method of generating optical pulses using an active mode-locking laser that includes first modulation means, optical selection means, second modulation means and amplification means, the method comprising: a step of using the first modulation means to modulate a lightwave; a step of selecting a modulation lightwave signal having a high frequency component by passing a lightwave through the optical selection means in a first direction; a step of using the second modulation means to modulate a lightwave; a step of selecting a modulation lightwave signal having a high frequency component by passing a lightwave through the optical selection means in a second direction; a step of amplifying the lightwave selected by the above step; and a step of supplying the amplified lightwave to the first modulation means.

With respect to the first and second modulation means, modulation has to be effected using a signal having the same frequency, and there also has to be a phase differential between the modulation signals arising in the propagation of the lightwave between the modulators. Therefore, the above method also comprises applying signals to the first and second modulation means that have the same frequency and a predetermined phase differential.

Plural optical paths can be arranged in a single Fabry-Perot etalon, but the most stable operation is provided by a configuration in which the same optical path is used bi-directionally. Therefore, the above method also comprises the first and second directions of the optical selection means being mutually reversed directions, and a region used in common by an optical path disposed in a first direction and an optical path disposed in a second direction.

The above object is also attained by an optical pulse generation apparatus comprising: an optical amplifier; an optical wave-guide; first modulation means; a configuration for selecting a modulation lightwave signal having a high frequency component by passing a lightwave in a first direction through an optical selection means for selecting a modulation lightwave that includes a high frequency component; second modulation means; a configuration for selecting a modulation lightwave signal having a high frequency component by passing a lightwave in a second direction through the optical selection means for selecting a modulation lightwave that includes a high frequency component; and a configuration for amplifying a lightwave thus selected and supplying the amplified lightwave to the first modulation means.

With respect to the first and second modulation means, modulation has to be effected using a signal having the same frequency, and there also has to be a phase differential between the modulation signals arising in the propagation of the lightwave between the modulators. Therefore, the above apparatus also comprises a configuration whereby signals are applied to the first and second modulation means that have the same frequency and a predetermined phase differential.

Plural optical paths can be arranged in a single Fabry-Perot etalon, but the most stable operation is provided by a configuration in which the same optical path is used bi-directionally. Therefore, the above apparatus also comprises the first and second directions of the optical selection means being mutually reversed directions, and a region used in common by an optical path disposed in a first direction and an optical path disposed in a second direction.

Further features of the invention, its nature and various advantages will be more apparent from the accompanying drawings and following detailed description of the invention.

DESCRIPTION OF THE PREFERRED EMBODIMENT

Details of embodiments of the present invention will now be described, with reference to the drawings. In the drawings showing configurations of the apparatus of the invention, similar parts and functions are denoted by the same reference symbols.

Figure 1:
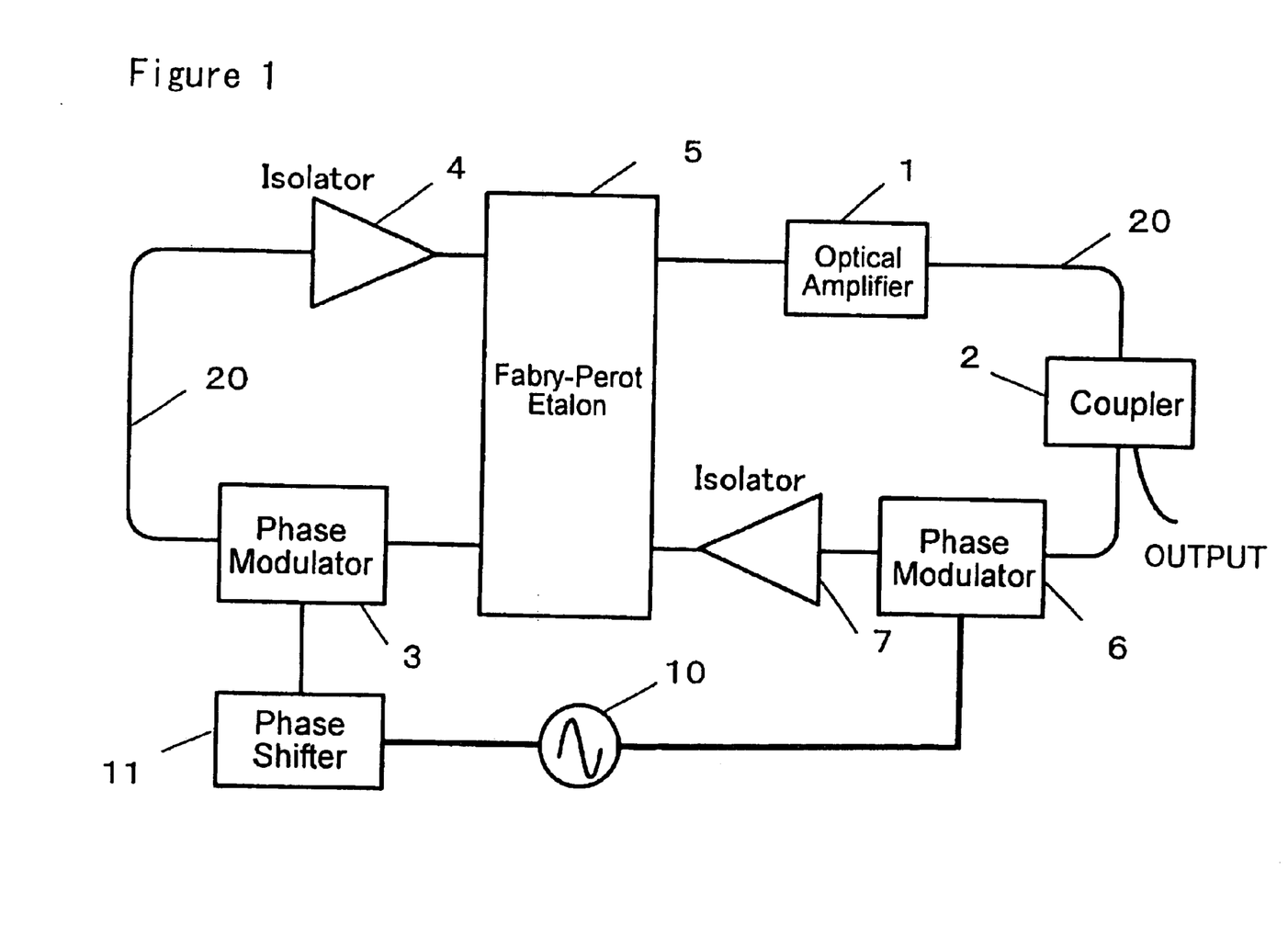
FIG. 1 is a block diagram of a configuration according to a first embodiment of the present invention.

FIG. 1 is a drawing of a first preferred embodiment of the present invention. Specifically, FIG. 1 is a block diagram of an optical pulse generation apparatus that has a single Fabry-Perot etalon with an optical path 20. In this configuration, a lightwave modulated by the phase modulator 3 enters the upper part of the Fabry-Perot etalon from the left side (with respect to FIG. 1), and a lightwave modulated by the phase modulator 6 enters the lower part of the etalon from the right. A modulation signal from a signal generator 10 is applied to the phase modulators 3, 6 that have the same frequency and a predetermined phase differential, the predetermined phase differential generated by the phase shifter 11. Although it is not an essential requirement, for the sake of stable operation it is desirable for the two lightwaves to be polarized in mutually orthogonal directions. Also, transmission characteristics can differ slightly from location to location even within the same etalon, so it is desirable to use locations at which the transmission characteristics are as identical as possible.

The merits of this configuration compared to that of the second prior-art example which uses two Fabry-Perot etalons, are that it is easier to control the temperature and that it only uses one Fabry-Perot etalon. It is well known that changes in the environmental temperature of a Fabry-Perot etalon can produce changes in the temperature of the structural materials of the etalon and in the refractive index of the optical path that can alter length of the optical path, resulting in changes in the transmission characteristics, especially the FSR. When two etalons are used, as in the above prior-art configuration, in order to maintain the FSR of each etalon, the etalons are usually placed in an isothermal chamber to keep the temperature constant and thereby eliminate the effects that changes in temperature can produce. In contrast, the embodiment shown in FIG. 1 has only one Fabry-Perot etalon. So, if the etalon is maintained at a constant temperature, the only deviation in transmission characteristics will come from non-uniformity of the temperature distribution in the etalon, which is usually small enough to be ignored, meaning the effect the transmission characteristic deviation has on the waveform of the generated optical pulses will also be small enough to be ignored.

Figure 2:
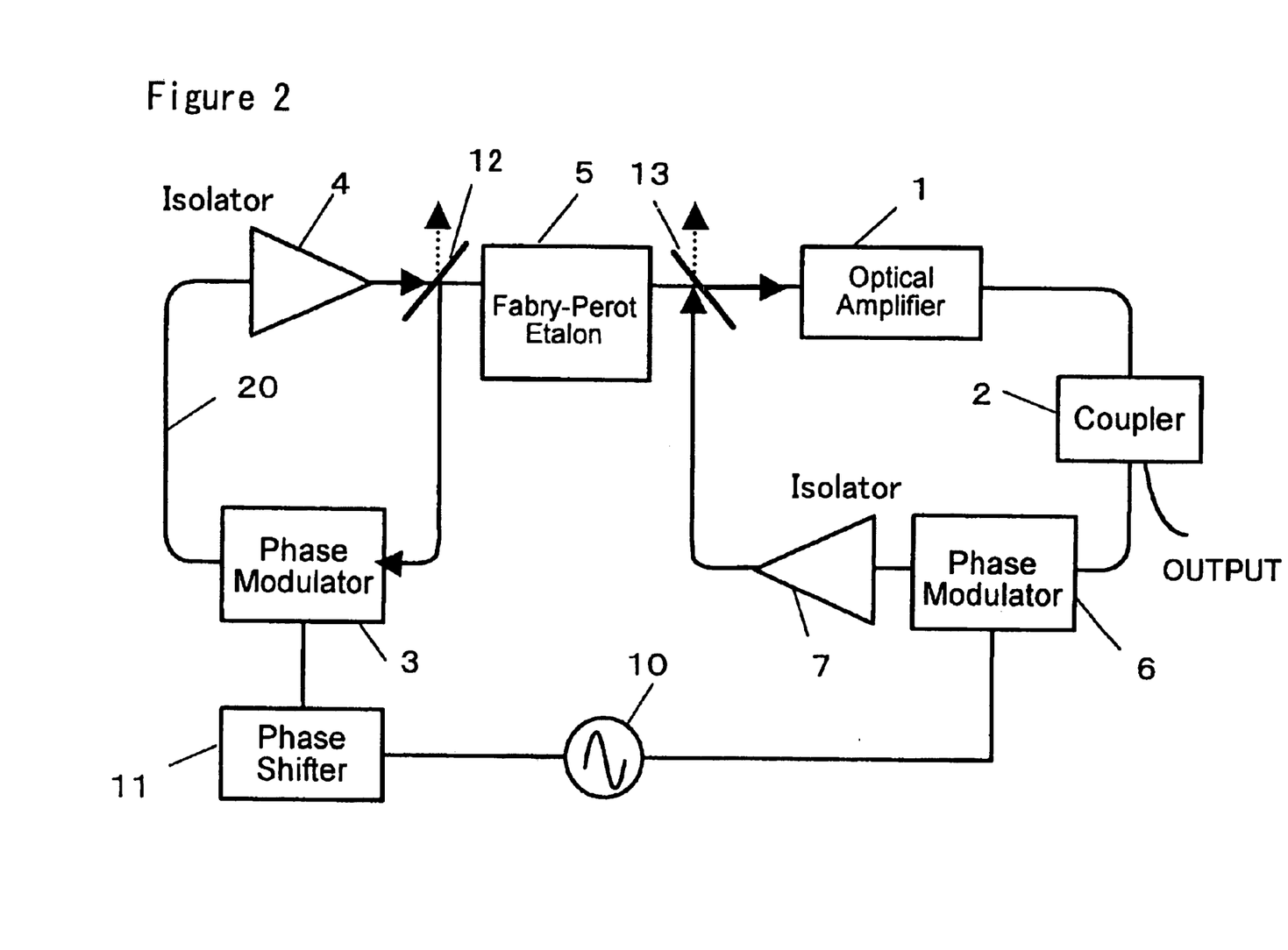
FIG. 2 is a block diagram of a configuration according to a second embodiment of the invention.

FIG. 2 shows a second preferred embodiment of the invention. In the optical pulse generation apparatus shown in FIG. 2, the optical paths via which the light enters the Fabry-Perot etalon from the left and right are in very close proximity or overlaid. In this configuration, the light enters the Fabry-Perot etalon 5 via an isolator 4 and beam splitter 12. The light transmitted by the Fabry-Perot etalon 5 is divided by beam splitter 13 into a beam that goes to an erbium-doped fiber optical amplifier 1 and a beam that goes to an isolator 7. The beam that goes to the isolator 7 goes no further, so only the optical path toward the phase modulator 6 will be described. At the coupler 2, the light is divided into a beam that is extracted as output light, and light that travels to the phase modulator 6. Phase-modulated light passes through the isolator 7 to the beam splitter 13. At the beam splitter 13, the light is divided into a beam that is transmitted in the direction indicated by the dotted line, and a beam that goes to the Fabry-Perot etalon 5. The optical path from the beam splitter 13 to the beam splitter 12 is disposed to overlay the above optical path. At the beam splitter 12, the light is divided into a beam that goes to the LiNbO$_3$ phase modulator 3 and a beam that goes to the isolator 4. The beam that goes to the isolator 4 goes no further, so only the optical path to the phase modulator 3 will be described. Light modulated by the phase modulator 3 is transmitted to the isolator 4.

The merit that the configuration of FIG. 2 has over that of FIG. 1 is that the effect that temperature distribution non-uniformity has on the waveform of the generated pulses is further decreased. Similarly, it can readily be understood that the effect of mechanical distortion is also decreased.

Figure 3:
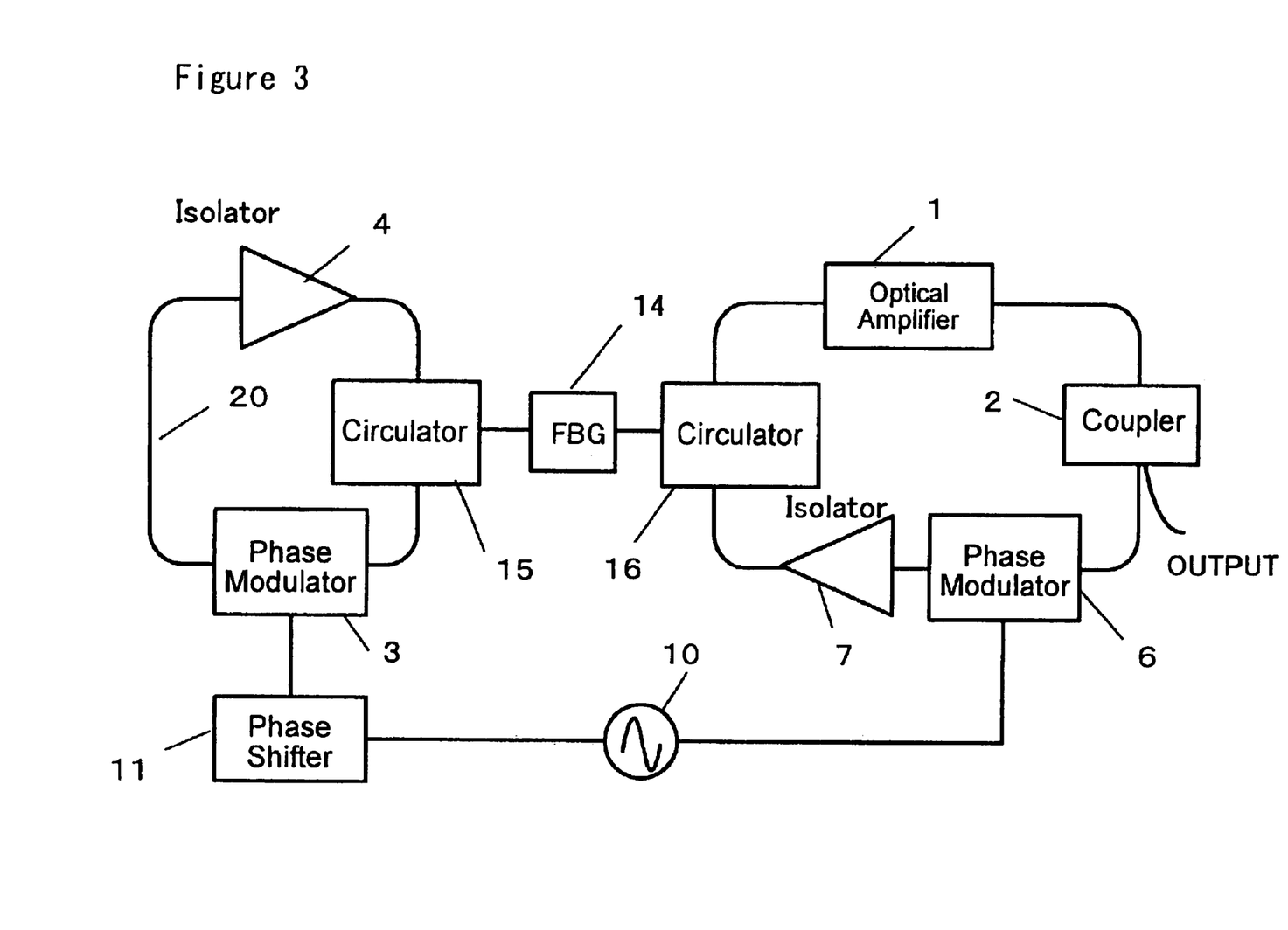
FIG. 3 is a block diagram of a configuration according to a third embodiment of the invention.

FIG. 3 shows a third embodiment of the invention, in the form of an optical pulse generation apparatus in which the optical paths are constituted by optical fibers. In this apparatus, the beam splitters 12 and 13 and Fabry-Perot etalon 5 of FIG. 2 have been replaced by circulators 15 and 16 and fiber Bragg grating (FBG) 14. When the characteristics of the circulator 15 enable the propagation of the optical pulses in the optical circuit to be limited to one direction, the related isolator can be omitted.

In the configuration of FIG. 3, light that passes through the isolator 4 passes through the circulator 15 and falls incident on the FBG 14. At the circulator 16, the direction of propagation of light transmitted by the FBG 14 is changed, sending the light toward the optical amplifier 1. At the coupler 2, the light is divided into a beam that is extracted as output light, and light that travels to the phase modulator 6. Phase-modulated light passes through the isolator 7 to the circulator 16, where the light is circulated toward the FBG 14. The optical path from the circulator 16 to the circulator 15 is arranged so that it overlays the above optical path. Light is circulated toward the phase modulator 3 by the circulator 15. Light modulated by the phase modulator 3 is transmitted to the circulator 15 via the isolator 4. A feature of the apparatus of FIG. 3 is its high shock-resistance, which enables it to be used in high-vibration environments.

The present invention, configured as described in the foregoing, provides the following effects.

The method of generating optical pulses uses an active mode-locking laser that includes first modulation means, optical selection means, second modulation means and amplification means, with the method comprising the steps of using the first modulation means to modulate a lightwave, selecting a modulation lightwave signal having a high frequency component by passing a lightwave through the optical selection means in a first direction, using the second modulation means to modulate a lightwave, selecting a modulation lightwave signal having a high frequency component by passing a lightwave through the optical selection means in a second direction, amplifying the lightwave selected by the above step, and supplying the amplified lightwave to the first modulation means, which makes it possible to reduce the number of etalons used and facilitates the control of the etalon temperature.

Signals are applied to the first and second modulation means that have the same frequency and a predetermined phase differential, satisfying one of the above-described conditions for operation. Moreover, the above method also comprises the first and second directions of the optical selection means being mutually reversed directions, and a region used in common by an optical path disposed in a first direction and an optical path disposed in a second direction, which makes it possible to ensure that differences in the transmission characteristics of the selection means do not arise as a result of mechanical distortion or non-uniformity of temperature distribution.

The optical pulse generation apparatus includes an optical amplifier, optical waveguide, first modulation means, a configuration for selecting a modulation lightwave signal having a high frequency component by passing a lightwave in a first direction through an optical selection means for selecting a modulation lightwave that includes a high frequency component, second modulation means, and a configuration for selecting a modulation lightwave signal having a high frequency component by passing a lightwave in a second direction through the optical selection means for selecting a modulation lightwave that includes a high frequency component, which makes it possible to reduce the number of etalons used and also makes it easier to control the etalon temperature.

In the apparatus, moreover, signals are applied to the first and second modulation means that have the same frequency and a predetermined phase differential satisfying one of the above-described conditions for operation. The apparatus is also configured so that first and second directions of the optical selection means are mutually reversed, and a region is used in common by the optical paths in both directions, making it possible to ensure that differences in the transmission characteristics of the selection means do not arise as a result of mechanical distortion or uneven temperature distribution.

What is claimed is:

1. A method of generating optical pulses using an active mode-locking laser that includes first modulation means, first routing means, optical selection means, second routing means, second modulation means and amplification means, said method comprising:

modulating a lightwave via the first modulation means;

routing the lightwave modulated by the first modulation means via the first routing means;

selecting a modulation lightwave signal having a high frequency component by passing the lightwave routed by the first routing means through the optical selection means in a first direction;

routing the lightwave selected by the optical selection means via the second routing means;

amplifying the lightwave routed by the second routing means via the amplification means;

modulating the lightwave amplified by the amplification means via the second modulation means;

routing the lightwave modulated by the second modulation means via the second routing means;

selecting a modulation lightwave signal having a high frequency component by passing the lightwave routed by the second routing means through the optical selection means in a second direction;

routing the lightwave selected by the optical selection means via the first routing means; and supplying the lightwave routed by the first routing means to the first modulation means.

2. The method according to claim 1, wherein the first and second modulation means have the same frequency and a predetermined phase differential, and said method further comprises applying electric signals to the first and second modulation means.

3. The method according to claim 1, wherein the first and second directions of the optical selection means are mutually reversed directions, and an optical path disposed in the first direction and an optical path disposed in the second direction have a region in common with each other.

4. An optical pulse generation apparatus comprising:

means for carrying a lightwave;

first means for modulating the lightwave;

first means for routing the lightwave modulated by the first means for modulating and a first lightwave, the first means for routing supplying the first lightwave to the first means for modulating;

means for selecting a first modulation lightwave signal having a high frequency component from the lightwave routed by the first means for routing passing in a first direction, and a second modulation lightwave signal having a high frequency component from a second lightwave passing in a second direction;

second means for routing the first modulation lightwave signal and the second lightwave;

means for amplifying the first modulation lightwave signal routed by the second means for routing; and second means for modulating the lightwave amplified by the means for amplifying, wherein the first lightwave comprises the second modulation lightwave signal having a high frequency component selected from the second lightwave passing in the second direction, and the second lightwave comprises the lightwave modulated by the second means for modulating.

5. The apparatus according to claim 4, wherein electric signals are applied to the first and second means for modulating having the same frequency and a predetermined phase differential.

6. The apparatus according to claim 4, wherein the first and second directions are mutually reversed directions, and an optical path disposed in the first direction and an optical path disposed in the second direction have a region in common with each other.

7. An optical pulse generation apparatus comprising:

an optical waveguide configured to carry a lightwave;

a first modulator configured to modulate the lightwave;

a first router configured to route the lightwave modulated by the first modulator and a first lightwave, the first router supplying the first lightwave to the first modulator;

an optical selection device configured to select a first modulation lightwave signal having a high frequency component from the lightwave routed by the first router passing in a first direction, and a second modulation lightwave signal having a high frequency component from a second lightwave passing in a second direction;

a second router configured to route the first modulation lightwave signal and the second lightwave;

an optical amplifier configured to amplify the first modulation lightwave signal routed by the second router; and a second modulator configured to modulate the lightwave amplified by the optical amplifier, wherein the first lightwave comprises the second modulation lightwave signal having a high frequency component selected from the second lightwave, and the second lightwave comprises the lightwave modulated by the second modulator.

* * * * *